(12) United States Patent
Gilpatrick (10) Patent No.: US 8,544,496 B2
(45) Date of Patent: Oct. 1, 2013

(54) GARDEN HOSE BOOSTER SYSTEM

(75) Inventor: Richard J. Gilpatrick, Whitewater, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 584 days.

(21) Appl. No.: 12/787,282

(22) Filed: May 25, 2010

(65) Prior Publication Data
US 2011/0290827 A1    Dec. 1, 2011

(51) Int. Cl.
*F16L 3/00* (2006.01)
*B65H 75/00* (2006.01)
*F04B 53/00* (2006.01)

(52) U.S. Cl.
USPC ............. 137/355.28; 239/195; 417/234

(58) Field of Classification Search
USPC .. 137/355.16–355.28, 355.12; 239/195–198; 417/234
See application file for complete search history.

(56) References Cited

U.S. PATENT DOCUMENTS

| | | | |
|---|---|---|---|
| 828,705 A | | 8/1906 | Bode |
| 979,382 A | * | 12/1910 | Coonradt ............... 239/197 |
| 1,079,717 A | * | 11/1913 | Owen et al. ............ 137/291 |
| 1,262,539 A | | 4/1918 | Micka |
| 1,369,567 A | | 2/1921 | Smith |
| 1,532,177 A | * | 4/1925 | Gist ...................... 248/89 |
| 2,397,267 A | * | 3/1946 | Sturm et al. ............ 222/25 |
| 2,678,457 A | | 1/1950 | Demo et al. |
| 2,540,240 A | | 2/1951 | Boyle |
| 2,640,724 A | * | 6/1953 | Sanders et al. ......... 137/259 |
| 3,030,890 A | | 4/1962 | Galik |
| 3,114,164 A | | 12/1963 | Riordan |
| 3,200,432 A | * | 8/1965 | Voegeli et al. ......... 15/323 |
| 3,283,352 A | | 11/1966 | Hu |

(Continued)

FOREIGN PATENT DOCUMENTS

| | | |
|---|---|---|
| WO | WO 2004/069436 | 8/2004 |
| WO | WO 2005/035417 | 4/2005 |

OTHER PUBLICATIONS

International Search Report and Written Opinion from International Application No. PCT/US2011/036837, mail date Aug. 25, 2011, 10 pages.
U.S. Appl. No. 12/411,139, filed Mar. 25, 2009, Gilpatrick.

(Continued)

*Primary Examiner* — Craig Schneider
*Assistant Examiner* — Jonathan Waddy
(74) *Attorney, Agent, or Firm* — Foley & Lardner LLP (57) ABSTRACT

A garden hose booster system includes a pump for pressurizing water, a motor connected to and designed to drive the pump, and a housing supporting the pump and the motor. The garden hose booster system further includes an inlet conduit, an outlet conduit, and a storage container. The inlet has a first garden hose coupling on an end thereof, and extends into the housing to direct the water to the pump. The outlet conduit has a second garden hose coupling on an end thereof, and extends out of the housing to direct the water from the pump. The storage container includes a bottom designed to be mounted to the top of the housing and a side wall extending upward from the bottom. The side wall and the bottom form an open volume within which a garden hose may be piled or coiled for storage thereof. The outlet conduit extends into the open volume of the storage container such that the garden hose stored in the storage container may be coupled to the second garden hose coupling and may receive a boosted water flow during operation of the garden hose booster system.

16 Claims, 9 Drawing Sheets

(56) References Cited

U.S. PATENT DOCUMENTS

| | | | |
|---|---|---|---|
| 3,306,213 A * | 2/1967 | Fritz | 417/440 |
| 3,383,044 A | 5/1968 | Norstrud et al. | |
| 3,456,680 A * | 7/1969 | Martiniak | 137/355.17 |
| 3,748,678 A | 7/1973 | Ballou | |
| 3,885,892 A * | 5/1975 | Dwyer et al. | 417/234 |
| 3,977,037 A * | 8/1976 | Miyake et al. | 15/315 |
| 4,084,281 A | 4/1978 | Smith | |
| 4,089,079 A | 5/1978 | Nicholson | |
| 4,135,860 A | 1/1979 | Van Nederkassel | |
| 4,207,640 A | 6/1980 | Sekula et al. | |
| 4,227,862 A | 10/1980 | Andrew et al. | |
| D260,134 S | 8/1981 | Bercu | |
| 4,373,444 A | 2/1983 | Cunnington | |
| 4,387,850 A | 6/1983 | Gerber | |
| 4,417,826 A | 11/1983 | Floros | |
| 4,461,052 A | 7/1984 | Mostul | |
| 4,507,053 A | 3/1985 | Frizzell | |
| 4,513,466 A | 4/1985 | Keddie et al. | |
| 4,532,666 A | 8/1985 | Smyth | |
| 4,621,984 A * | 11/1986 | Fussell | 417/234 |
| 4,671,315 A * | 6/1987 | Gardner | 137/355.12 |
| 4,763,373 A | 8/1988 | Sanchez | |
| 4,856,133 A | 8/1989 | Sanchez | |
| 5,007,127 A | 4/1991 | Paolo | |
| 5,011,034 A | 4/1991 | Abel | |
| 5,129,121 A | 7/1992 | Gelman | |
| D330,322 S | 10/1992 | Wilson | |
| 5,395,052 A | 3/1995 | Schneider et al. | |
| 5,421,520 A | 6/1995 | Simonette et al. | |
| 5,529,460 A | 6/1996 | Eihusen et al. | |
| 5,560,391 A | 10/1996 | Bantaculo | |
| 5,568,824 A | 10/1996 | Cordrey | |
| 5,619,766 A | 4/1997 | Zhadanov et al. | |
| 5,649,334 A | 7/1997 | Henriquez et al. | |
| 5,678,596 A | 10/1997 | Carallo | |
| 5,741,124 A | 4/1998 | Mazzucato et al. | |
| 5,816,499 A * | 10/1998 | Christiansen | 239/198 |
| 5,911,256 A | 6/1999 | Tsai | |
| 5,913,982 A | 6/1999 | Phillips | |
| 5,988,207 A | 11/1999 | Kownacki et al. | |
| 6,021,539 A | 2/2000 | Zhadanov et al. | |
| 6,050,291 A | 4/2000 | Whitehead et al. | |
| D432,002 S | 10/2000 | Anderson et al. | |
| D435,405 S | 12/2000 | Clark, Jr. | |
| 6,164,496 A | 12/2000 | Gregory | |
| 6,189,811 B1 | 2/2001 | Rudy | |
| 6,546,953 B1 * | 4/2003 | Kowalke | 137/355.16 |
| 6,571,805 B2 | 6/2003 | Hoenisch et al. | |
| 6,687,924 B2 | 2/2004 | Wright et al. | |
| 6,688,855 B2 | 2/2004 | Becdkerman | |
| 6,807,982 B1 | 10/2004 | Ames | |
| 6,915,541 B2 | 7/2005 | Alexander | |
| 7,080,953 B2 | 7/2006 | DeLaine, Jr. | |
| 7,083,120 B2 | 8/2006 | Gilpatrick et al. | |
| 7,217,053 B2 | 5/2007 | Alexander et al. | |
| 7,222,644 B2 | 5/2007 | Pianetto et al. | |
| 7,252,193 B1 | 8/2007 | Lewis et al. | |
| 7,281,903 B2 | 10/2007 | Reverberi et al. | |
| 7,316,368 B2 | 1/2008 | Moon et al. | |
| D561,010 S | 2/2008 | Anderson et al. | |
| D580,621 S | 11/2008 | Anderson et al. | |
| D582,757 S | 12/2008 | Anderson et al. | |
| D584,938 S | 1/2009 | Steele | |
| 7,472,842 B2 | 1/2009 | Gilpatrick et al. | |
| 2003/0183276 A1 * | 10/2003 | Kondas et al. | 137/355.28 |
| 2005/0161538 A1 | 7/2005 | Cattaneo et al. | |
| 2005/0164554 A1 | 7/2005 | Cattaneo et al. | |
| 2006/0275146 A1 * | 12/2006 | Williams | 417/234 |
| 2007/0009026 A1 | 1/2007 | Kwon et al. | |
| 2007/0113368 A1 | 5/2007 | Alexander | |
| 2007/0114319 A1 | 5/2007 | Anderson et al. | |
| 2007/0125878 A1 | 6/2007 | Hahn et al. | |
| 2008/0014096 A1 | 1/2008 | Gilpatrick | |
| 2008/0083077 A1 | 4/2008 | Alexander et al. | |
| 2008/0295894 A1 | 12/2008 | Uffner et al. | |
| 2008/0300727 A1 | 12/2008 | Zarowny et al. | |
| 2009/0071546 A1 | 3/2009 | Lawrence | |

OTHER PUBLICATIONS

Energy Tips—Pumping Systems, Pumping Systems Tip Sheet #12, Control Strategies for Centrifugal Pumps with Variable Flow Rate Requirements, U.S. Department of Energy, dated May 2007, 2 pages.

Garden Hose Centrifugal Pump I BIC Superstore, Flint Walling/Star HPP360 Garden Hose Centrifugal Pump, printed on Jan. 6, 2009, from Internet address: http://www.bicsuperstore.com/Garden-Hose-Centrifugal-Pump/M/B000DZKZ02.htm, 3 pages.

Gauges, Water Pumps, and Flow Meters from Premium Water Filters, Premium Water Filters, printed on Jan. 6, 2009, from Internet address: http://www.premium-water-filters.com/gauges-pumps.htm, 12 pages.

Garden Hose Comfort Grip Nozzle 7 Pattern #594 by Gilmour Manufacturing at HardwareandTools.com, Garden Hose Nozzles Zinc "Select-A-Spray", printed on Jan. 6, 2009, from Internet address: http://www.hardwareandtools.com/invt/3774379, 4 pages.

Images from Internet search, May 24, 2010, Believed to be commercially available by May 21, 2010, 1 page.

Images from Living Accents Hose Container, http://www.acehardware.com/product/index, May 24, 2010, 1 page.

Images from Wicker Hose Bowl, http://www.gardeners. Com/wicker-hose-bowl, May 24, 2010, 1 page.

Images from Amazon.com: CobraCo HHCIRN-S Cooper Cylinder Hose Holder, http://www.amazon.com/CobraCo-HHCIRN-S-SpCopper-Cylinder, 1 page.

Images from Internet search, May 24, 2010, Believed to be commercially available by May 21, 2010 http://www2.yardiac.com/show_category.asp?tgs=36639374:31119355&cart_id=&category=2334 and http://www2.yardiac.com/show_category.asp?tgs=36639374:31119355&cart_id=&category=3365, 1 page.

* cited by examiner

GARDEN HOSE BOOSTER SYSTEM

BACKGROUND

The present disclosure relates generally to the field of water pumps. More specifically the present disclosure relates to a booster water pump system for use with a garden hose.

Household garden hoses may be used for a wide variety of tasks around a home. However at the unassisted water pressures supplied by household plumbing systems, the out-going streams may be fairly weak. For example, typically homes using municipal or well water are limited to water from a faucet or bibcock at a pressure of about 40 to 60 pounds per square inch (psi), flowing at a rate of about 3 to 5 gallons per minute (gpm). As such, the water pressure and flow rate may be insufficient to effectively scrub surfaces, quickly water plants, or controllably spray distant cleaning targets.

To compensate for insufficient water pressure, household garden hoses may be fitted with a wide variety of fittings and nozzles to increase the water pressure in the system and to provide a stream of water with an increased exit velocity. However to increase the out-going velocity of the water stream, such nozzles may greatly reduce the out-going flow rate.

Devices other than garden hose booster pumps, such as powered pressure washers for example, may help clean dirt, paint, or mold from pavement, brick face, or other surfaces. To achieve such results, these devices may provide a water stream with a greatly increased pressure (e.g., approximately 1400 psi), but a greatly reduced flow rate (e.g., approximately 1.3 to 1.4 gpm). Some heavy-duty pressure washers may provide streams with even higher pressures (e.g., 3000 to 5000 psi) and possibly greater flow rates (e.g., 3.5 gpm) to perform other tasks, such as resurfacing or cutting of materials that require extremely powerful flows. Accordingly, high-pressure hose lines and spray guns are generally needed with these heavy-duty pressure washers.

SUMMARY

One embodiment of the invention relates to a garden hose booster system, which includes a pump for pressurizing water, a motor connected to and designed to drive the pump, and a housing supporting the pump and the motor. The garden hose booster system further includes an inlet conduit, an outlet conduit, and a storage container. The inlet has a first garden hose coupling on an end thereof, and extends into the housing to direct the water to the pump. The outlet conduit has a second garden hose coupling on an end thereof, and extends out of the housing to direct the water from the pump. The storage container includes a bottom designed to be mounted to the top of the housing and a side wall extending upward from the bottom. The side wall and the bottom form an open volume within which a garden hose may be piled or coiled for storage thereof. The outlet conduit extends into the open volume of the storage container such that the garden hose stored in the storage container may be coupled to the second garden hose coupling and may receive a boosted water flow during operation of the garden hose booster system.

Another embodiment of the invention relates to a garden hose booster system, which includes a base, a storage container, and a cover. The base has a housing and a motorized pump therein. The storage container is mounted to the base, and has an open volume formed therein configured to store a garden hose. A conduit extends from the motorized pump into the storage container, and includes a garden hose coupling on an end thereof configured for attachment of the garden hose thereto. The cover is designed to be received on a top of the storage container, where the cover may be lifted off and separated from the storage container, or placed on and coupled to the storage container to selectively allow access to the open volume.

Yet another embodiment of the invention relates to a garden hose booster system, which includes a base, a storage container, and a cover. The base includes a pump, a motor connected to the pump, and a housing supporting the motor and the pump. The base further includes an inlet conduit connected to a side of the housing, to direct water to the pump, and an outlet conduit coupled to a top of the housing, to direct water from the pump. The storage container is designed to be mounted to the base, and has an open volume formed therein that is designed to store a garden hose. The outlet conduit of the base is accessible within the storage container. The cover is designed to be attached to the storage container to limit access to the open volume of the storage container.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Serving as a middle ground between unassisted garden hoses and powered pressure washers, garden hose booster pumps provide extra water pressure (e.g., between 100 to 500 psi above unassisted pressure) and increased flow rate (e.g., greater than 5 gpm) for indoor or outdoor applications, such as gardening, cleaning, or other applications. Water pressure levels produced by garden hose booster pumps are low enough that standard, conventional garden hoses may be used therewith, but high enough to meet the requirements of various tasks, such as removing stuck-on plant debris from a vehicle, dried-on bird waste from a window, or spider webs from an eve of a high roof line, for example. As such, the added boost provided by a garden hose booster pump may produce water streams powerful enough to enhance performance of everyday household cleaning tasks that are generally outside of the capabilities of both unassisted garden hoses and powered pressure washers.

Garden hose booster pumps may be better suited to operate with typical garden hoses (at pump outlet) than pressure washers due to limiting characteristics of garden hoses, such as garden hose burst ratings. A conventional garden hose may be made from a wide variety of commonly known materials such as vinyl, rubber, composite, and the like. For example, typical garden hose characteristics may vary depending design choice, such as hose dimensions, gauge, material, reinforcement, and the like. Due to the variety of design choices and available materials, different commercial garden hoses have a broad range of "burst ratings," the maximum allowable internal pressures that the hose can withstand before danger of rupture. Some lower-capacity hoses have a burst rating of about 200 psi. Other medium-capacity hoses have burst ratings ranging from about 275 to 350 psi. Still other higher-capacity garden hoses have burst ratings from about 350 to 500 psi or higher. While garden hose booster pumps may be designed for use with conventional garden hoses, garden hoses are not required for operation of the garden hose booster pumps. Other hoses and conduits may be used.

Figure 1:
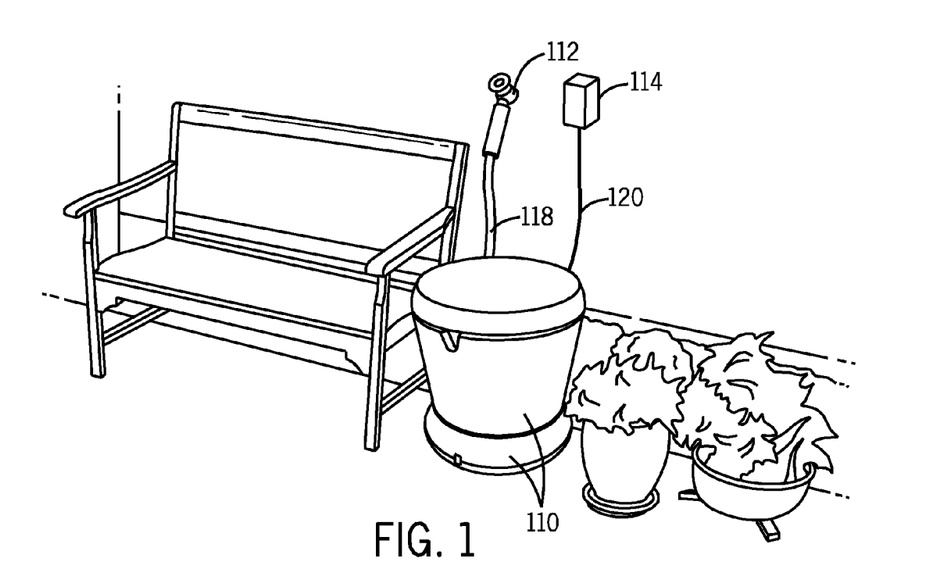
FIG. 1 is a perspective view of an outdoor patio including a garden hose booster system according to an exemplary embodiment of the invention.
Figure 4:
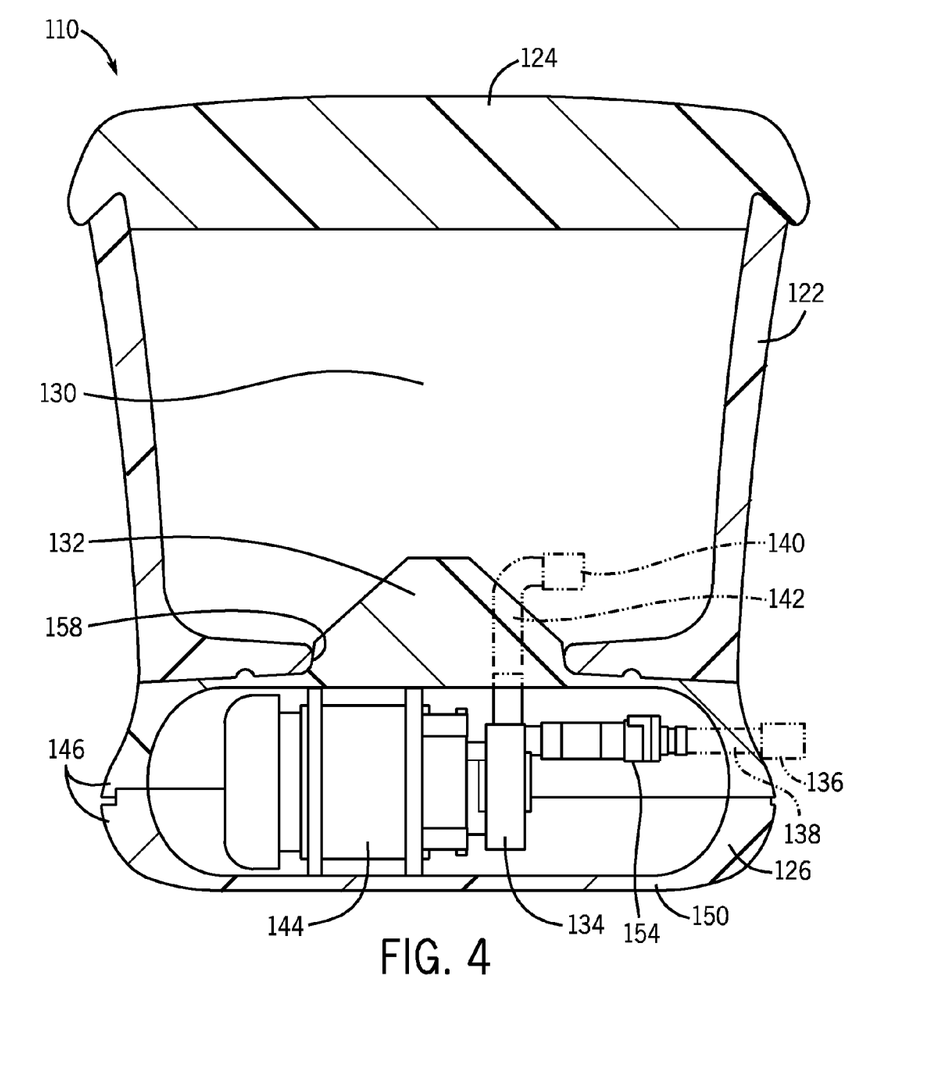
FIG. 4 is a sectional view of the garden hose booster system of FIG. 2, taken along line 4-4 of FIG. 2.

Referring to FIG. 1, a garden hose booster system 110 is positioned on an outdoor patio, proximate to a faucet 112 and an electrical power outlet 114. The garden hose booster system 110 receives water from the faucet 112 by way of a conventional garden hose 118 and receives electricity from the power outlet 114 by way of a power cord 120. During operation of the garden hose booster system 110, a pump (see, e.g., pump 134 as shown in FIG. 4) associated with the garden hose booster system 110 is powered via the power cord 120 and may be used to selectively enhance (e.g., boost) the flow rate and/or pressure of water flowing from the garden hose 118. A bench, plants, and flower pots are included on the patio of FIG. 1, providing non-limiting context for at least one exemplary embodiment of the garden hose booster system 110.

Figure 2:
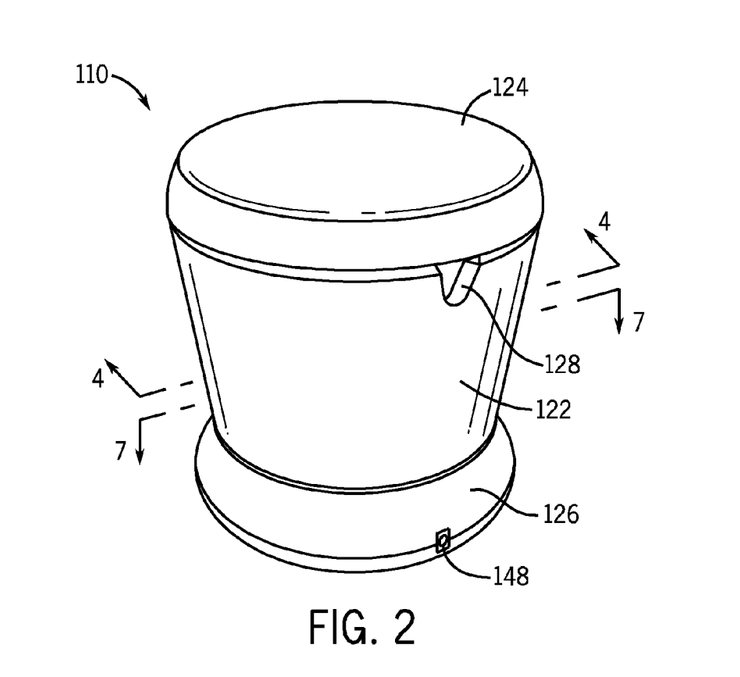
FIG. 2 is a perspective view of a garden hose booster system according to another exemplary embodiment of the invention.
Figure 3:
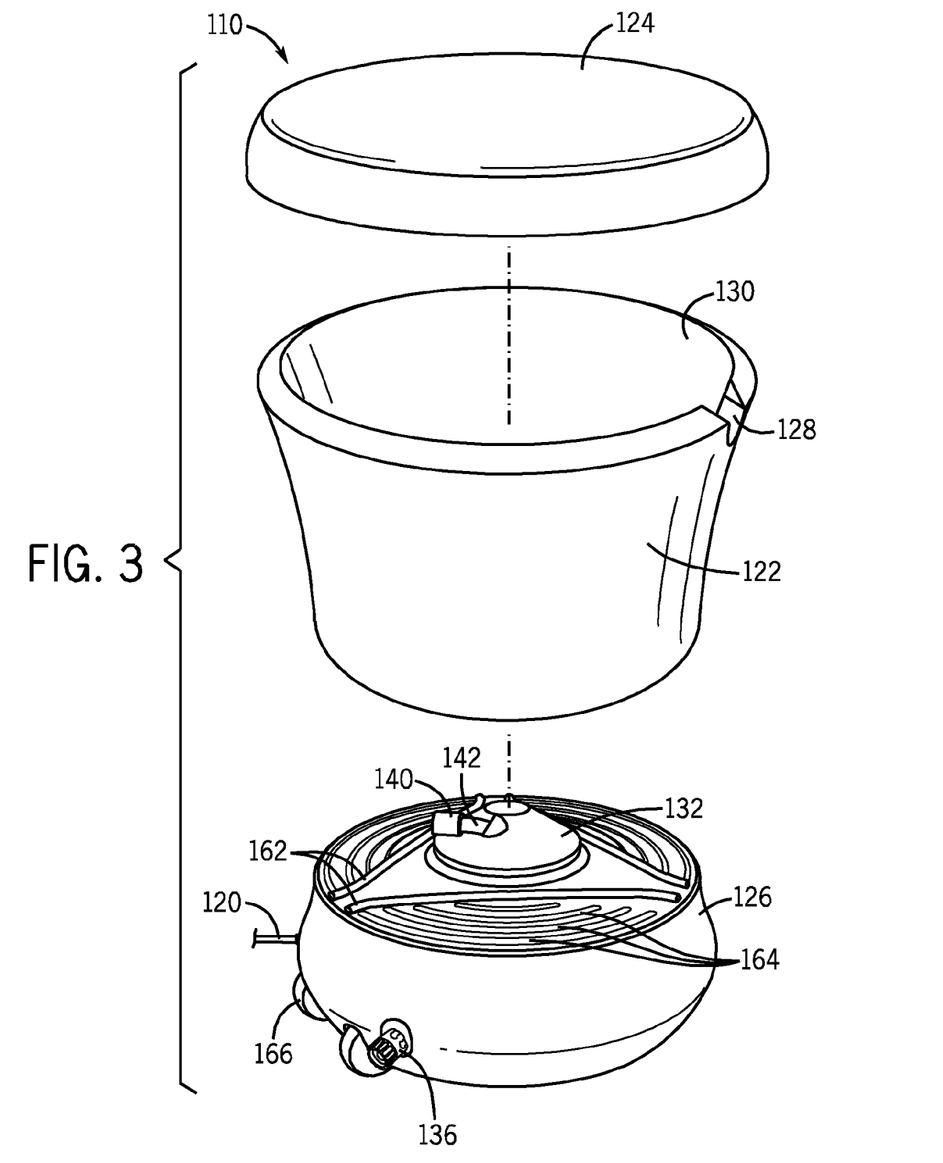
FIG. 3 is an exploded view of the garden hose booster system of FIG. 2.
Figure 15:
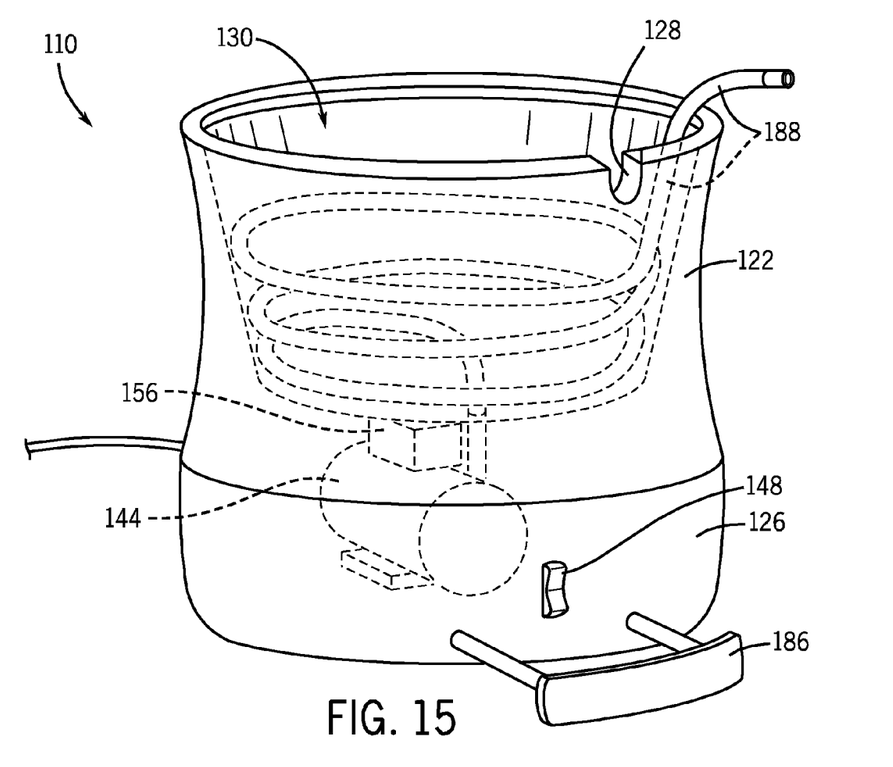
FIG. 15 is a perspective view of a garden hose booster system with an extended handle according to an exemplary embodiment of the invention.

Referring to FIGS. 2-3, the garden hose booster system 110 includes a storage container 122 for a garden hose (see, e.g., garden hose 188 as shown in FIG. 15), a cover 124 for the storage container 122, and a base 126 upon which the storage container 122 is coupled (e.g., mounted, fastened, fixed, stacked). In some embodiments, the bottom of the storage container 122 and the top of the base 126 include structure to support alignment therebetween, and for coupling the storage container 122 to the base 126. Such structure may include extensions on one of the housing (e.g., shell, exterior frame) of the storage container 122 or the base 126 and corresponding grooves or apertures on the other. In other embodiments, threaded fasteners, glues, spot welding, or other fastening methods and tools may be used to couple the storage container 122 and the base 126. In still other embodiments, the base and storage container may be an integral unitary body.

According to an exemplary embodiment, the cover 124 may be coupled to the storage container 122 in a closed configuration, or completely lifted off and moved away from the storage container 122 in an open configuration. A pressure fit and the weight of the cover 124 may be used to fasten the cover 124 to the storage container 122. An opening 128 positioned between the cover 124 and the storage container 122 allows the garden hose to extend to the exterior of the storage container 122 while the cover 124 is attached. In other embodiments, a garden hose booster system may not include a cover, or the cover may be hinged or otherwise connected to the storage container.

Referring to FIGS. 3-4, the storage container 122 includes an open volume 130 (e.g. unobstructed space) formed therein, within which a garden hose (see, e.g. garden hose 188 as shown in FIG. 15) may be coiled, stacked, or simply piled into the open volume 130. In some such embodiments, the open volume 130 does not include a rack or reel upon which the garden hose may be stored, but the bottom of the open space may include a boss 132 (e.g., knob, protrusion, cone) around which the hose may optionally be coiled. With the garden hose placed in the storage container 122, the cover 124 may be placed atop the storage container 122 to shield the open volume 130 from the elements, to limit access to the garden hose, and for aesthetic reasons. According to an exemplary embodiment, the cover 124 is contoured to match the cylindrical shape of the storage container 122 such that the garden hose booster system 110 resembles a large lidded pot.

In some embodiments, the storage container 122, the cover 124, and/or other portions of the garden hose booster system 110 are formed from plastic, aluminum, composite, ceramic, or other materials. In at least one embodiment, two shells are fastened together to form the storage container 122 an inner shell (e.g., liner) and an outer shell (e.g. exterior housing). The shells may be formed from the same or different materials, or combinations of materials. In such an embodiment, another two shells are fastened together to form the cover 124. Air, foam, or other materials may be provided between the shells when the shells are assembled.

Referring to FIGS. 4-7, within the base 126, the garden hose booster system 110 includes a pump 134 configured to selectively enhance (e.g., boost) the flow rate and/or pressure of water flowing through the garden hose booster system 110. A garden hose (see, e.g., garden hose 118 as shown in FIG. 1) may be coupled to a first hose coupling 136 on an end of an inlet conduit 138 for the pump 134, which may then deliver water to the pump 134. After enhancing the flow rate and/or pressure of the water, an outlet conduit 142 from the pump 134 may deliver the water to another garden hose (see, e.g., garden hose 188 as shown in FIG. 15) that is coupled to a second hose coupling 140 on an end of the outlet conduit 142.

According to an exemplary embodiment, the second hose coupling 140 is accessible through the storage container 122, such that the garden hose (see, e.g. garden hose 188 as shown in FIG. 15) stored therein may be coupled to the pump 134. In some embodiments, the first hose coupling 136 is a female hose coupling and the second hose coupling 140 is a male hose coupling. The hose couplings 136, 140 may be threaded couplings, quick-connect couplings, or other forms of commercially-available hose couplings. In other embodiments, the outlet conduit is coupled to two or more hose couplings, allowing for connections of multiple garden hoses to the garden hose booster system 110 (e.g., for supply of simultaneous sprinklers).

According to an exemplary embodiment, the pump 134 is a centrifugal pump, driven by an electric motor 144. The power cord 120 extends through a wall 146 (e.g., side wall) of the base 126 via an opening 174 (see FIG. 13) and to a switch 148 (e.g., on/off switch, throttle lever, power setting toggle), and then from the switch 148 to the motor 144. The motor 144 and the pump 134 are fastened to another wall 150 (e.g., bottom wall) of the base 126 (compare FIG. 5 with FIG. 6). Pillars or posts 152 may be positioned between the motor 144 and the wall 150, allowing for cooling air to flow therethrough. When activated, the motor 144 rotates an impeller (not shown) of the pump 134, which accelerates water provided near the center thereof outward toward the periphery thereof. In some embodiments, when the impeller is not running, water may pass around the impeller and through the pump 134 at unassisted flow rates and water pressures.

In other embodiments, check valves or other flow-control devices (e.g., bypass conduit, hydraulic switch) otherwise direct water through the pump when the impeller is inactive. In still other embodiments, different types of pumps are used to power a garden hose booster system, including axial cam pumps, radial cam pumps, triplex pumps, positive displacement pumps, and other types of pumps.

Figure 5:
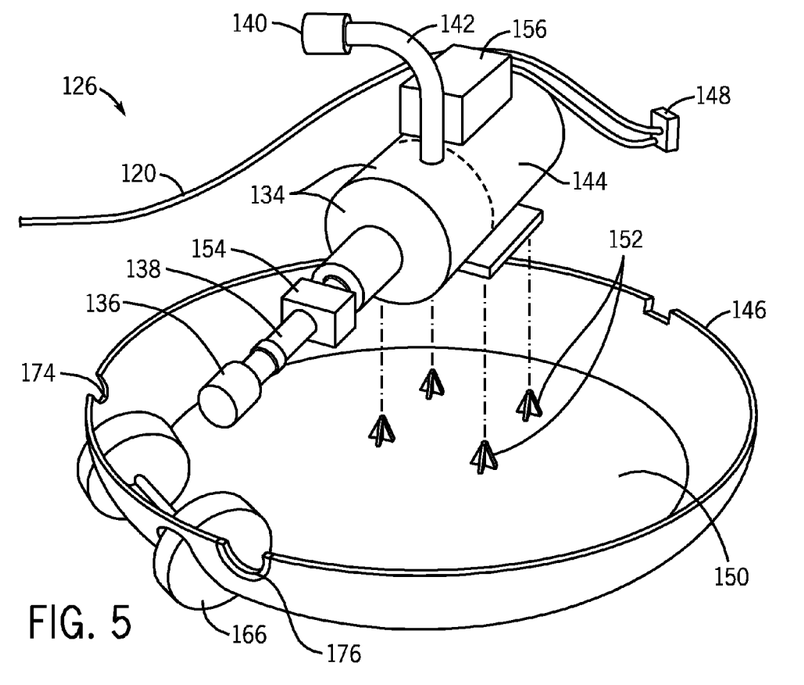
FIG. 5 is an exploded view of a portion of the garden hose booster system of FIG. 2 according to an exemplary embodiment of the invention.
Figure 6:
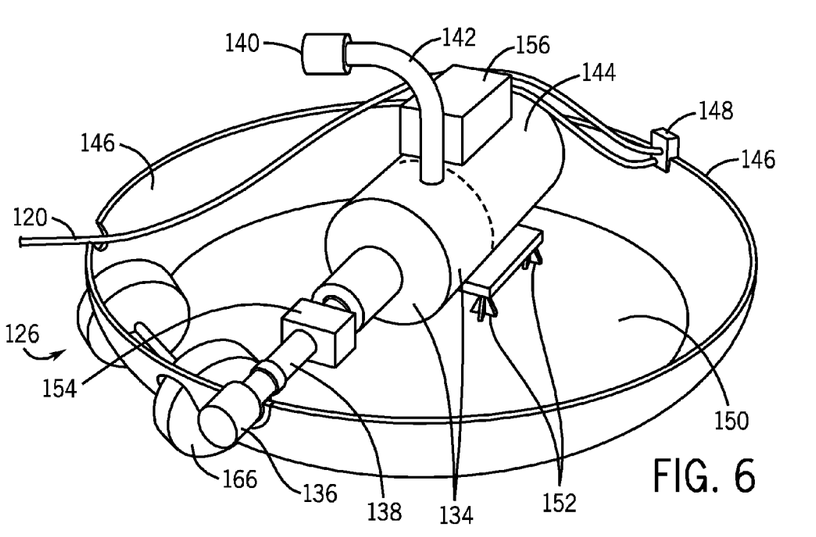
FIG. 6 is a perspective view of the portion of the garden hose booster system of FIG. 5.
Figure 7:
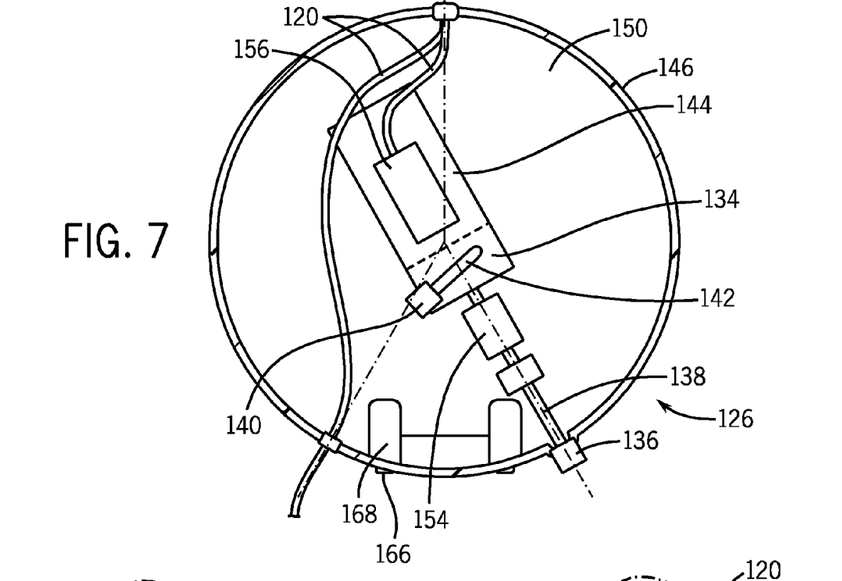
FIG. 7 is a top view of the portion of the garden hose booster system of FIG. 5.
Figure 8:
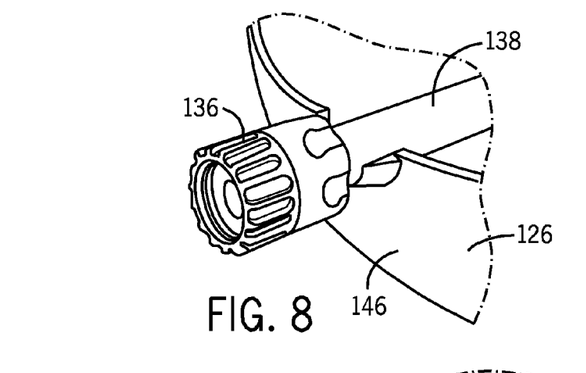
FIGS. 8-10 are perspective views of features of the garden hose booster system of FIG. 2 according to an exemplary embodiment of the invention.
Figure 9:
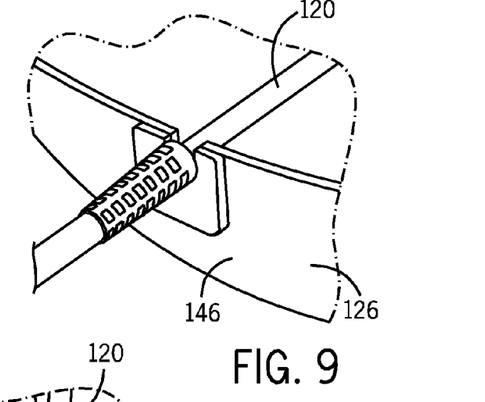
Figure 10:
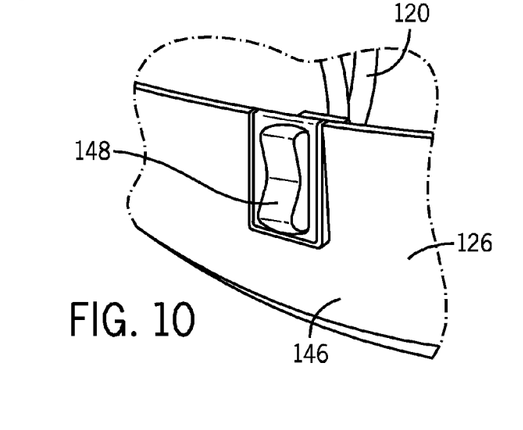

Referring to FIGS. 5-7, in some exemplary embodiments, the garden hose booster system 110 further includes at least one sensor 154 and control circuitry 156 (e.g., computer, programmable logic controller). In some embodiments, the sensor 154 may be flow-sensitive and may provide data associated with the flow rate of water through the inlet conduit 138, the pump 134, the outlet conduit 142, or another portion of the flow path. In other embodiments, the sensor 154 may be pressure sensitive and configured to sense changes in pressure associated with water flowing through the pump, such as an occurrence of back pressure when the garden hose is not actively spraying. In still other embodiments, other types of sensors may be used, such as load cells, strain gauges, etc. Alternate locations for the sensor 154 may be used, such as proximate to the outlet conduit 142 or within range of radio frequency communication with the faucet 112.

According to an exemplary embodiment, the control circuitry 156 may use data provided by the sensor 154 to operate the motor 144. In some embodiments, back pressure data provided by the sensor 154 may be used by the control circuitry 156 to idle/deactivate or power up the motor 144. In other embodiments, different flow rates data provided by the sensor 154 may be used by the control circuitry 156 to idle/deactivate or power up the motor 144. In some such embodiments, the control circuitry 156 may change the speed of the motor as a function of the data provided by the sensor 154. The control circuitry 156 may rely upon other real-time data (e.g., present throttle setting, dead-man switch) and preprogrammed logic to operate the motor 144 instead of or in combination with data from the sensor 154. In still other embodiments, a garden hose booster system does not include either a sensor or control circuitry, but instead is controlled by manual operation of the switch 148 and/or an interface (e.g., dial) to control motor speed.

Referring to FIGS. 7-10, the inlet conduit 138 (FIG. 8) and the power cord 120 (FIG. 9) are positioned on a back side of the base 126 of the garden hose booster system 110. The switch 148 (FIG. 10) is positioned on the front side of the base 126. Arranging the pump 134 and the motor 144 horizontally in the base 126 (see, e.g., FIG. 4) is intended to provide increased stability for the garden hose booster system 110, by weighting the bottom thereof. However in other embodiments, the pump 134 and/or the motor 144 may be oriented vertically through a center of a garden hose booster system, where the open volume for storage of the garden hose may be in an annular chamber formed between the pump and the exterior housing structure of such a garden hose booster system.

Figure 11:
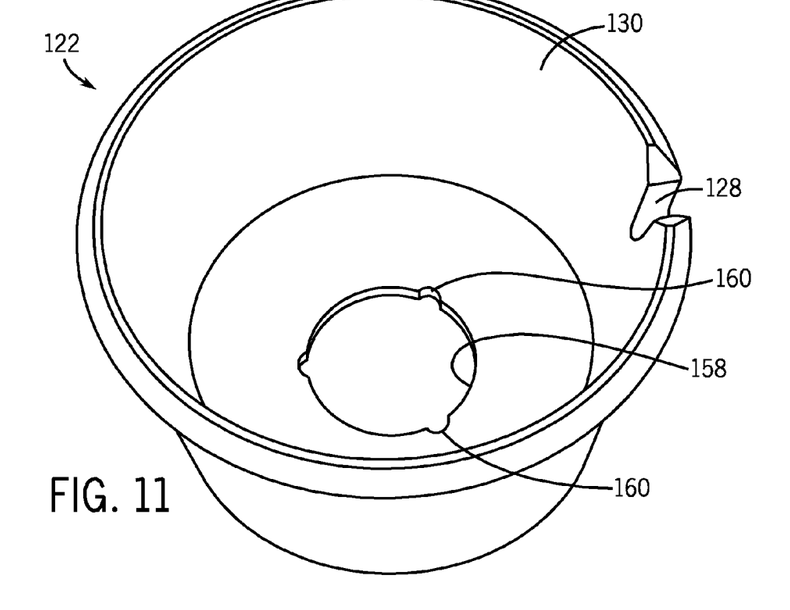
FIG. 11 is a perspective view of a storage container of the garden hose booster system of FIG. 2.
Figure 12:
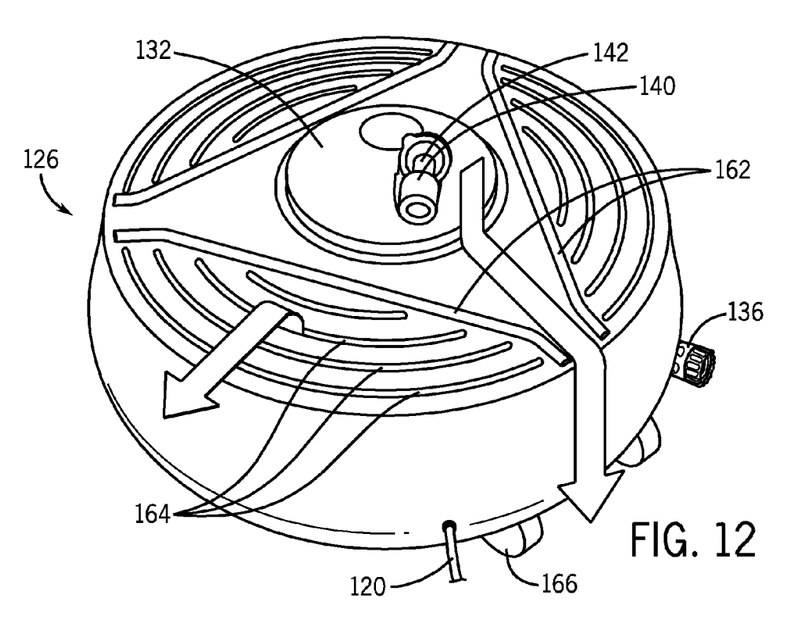
FIG. 12 is a perspective view of a base of the garden hose booster system of FIG. 2.

Referring now to FIGS. 11-12, the garden hose booster system 110 includes features for managing the presence of unwanted heat and water. In some embodiments, the bottom of the storage container 122 includes an opening 158 through which the boss 132 of the base 126 extends when the storage container 122 and the base 126 are coupled together. Along the periphery of the opening 158, the storage container 122 includes one or more notches 160 to facilitate drainage of the storage container 122. Rain water, excess water from the garden hose, or other sources of water may pass through the notches 160, to the top of the base 126.

The base 126 includes guide structure 162 (e.g., channels, canals, vanes) for directing the flow of water received from the notches 160 of the storage container 122. The guide structure 162 directs the water from the top of the base 126 to one or more sides thereof, preferably in locations that are away from features on the sides of the base 126, such as the power cord 120 and the switch 148. The top of base 126 further includes openings 164 (e.g., vents) providing access for air to cool the motor 144 (or to provide air to a combustion engine). During operation of the motor 144, waste heat from the motor 144 may exit the garden hose booster system 110 through the openings 164.

Figure 13:
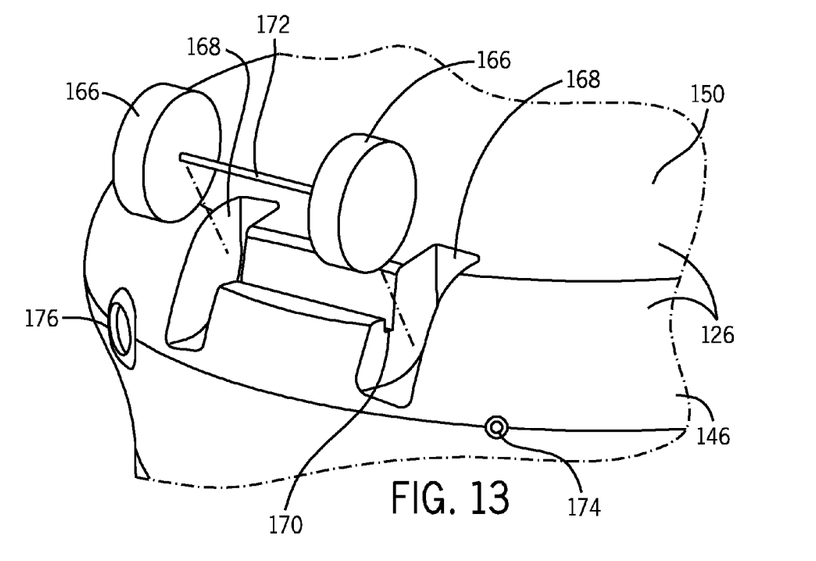
FIG. 13 is an exploded view of a portion of the underside of the base of FIG. 12 (turned over, relative to the orientation of FIG. 12).

Referring to FIG. 13, the base 126 of the garden hose booster system 110 includes structure to support wheels 166. The structure includes wells 168 within which the wheels 166 may turn and a groove 170 within which an axle 172 for the wheels 166 may be positioned. According to an exemplary embodiment, the wheels 166 are located on the back side of the base 126, between the power cord opening 174 and an opening 176 for the inlet conduit 138 in the wall 146 of the base 126. In other embodiments, other numbers of wheels may be used, the wheels may be retractable, and casters may be used. In still other embodiments, wheels are not included.

Figure 14:
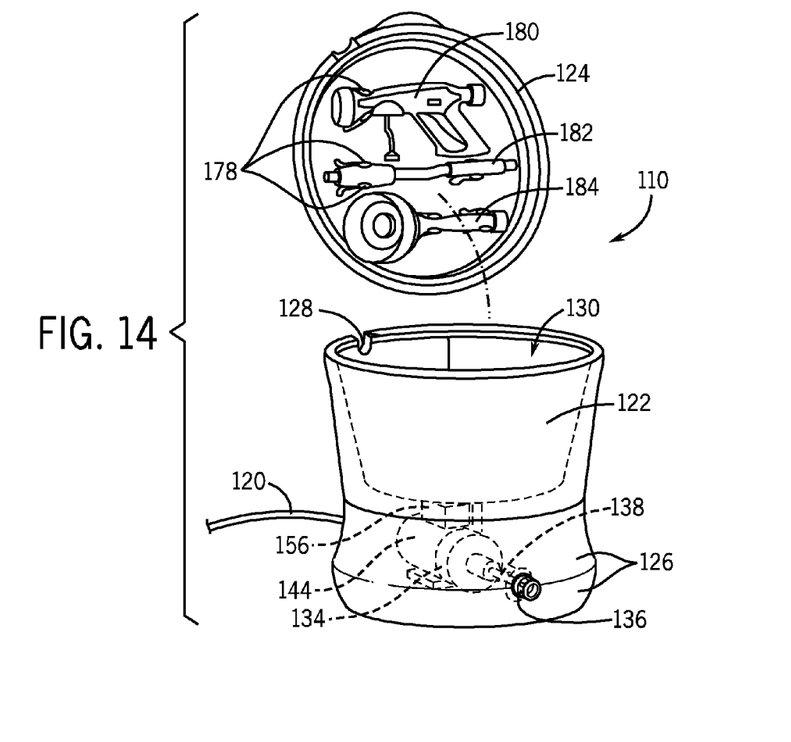
FIG. 14 is a perspective view of a garden hose booster system with an open cover according to an exemplary embodiment of the invention.

Referring to FIG. 14, the underside of the cover 124 includes support structure 178 (e.g., hooks, catches, contoured recesses, etc.). The support structure 178 may be configured to store sprayers for the garden hose booster system 110, such as a spray gun 180, a flexible handle assembly 182, and a spraying bush 184. In some embodiments, the support structure 178 may be configured to hold chemical containers (e.g., soap bottle, fertilizer container), sprinklers, nozzles for the spray gun 180, or other items associated with the garden hose booster system 110. In other embodiments, the cover includes no such structure.

Referring to FIG. 15, the garden hose booster system 110 includes a handle 186, preferably positioned opposite to the wheels 166. In some embodiments, the handle 186 is extendable and retractable, and is contoured to visually blend into the surface of the garden hose booster system 110 when retracted. In other embodiments, the handle is molded into a wall of the base, such as proximate to the bottom edge of the base. The handle may be coupled to the base 126, the storage container 122, or the cover 124. In still other embodiments, no such handle is included.

Figure 16:
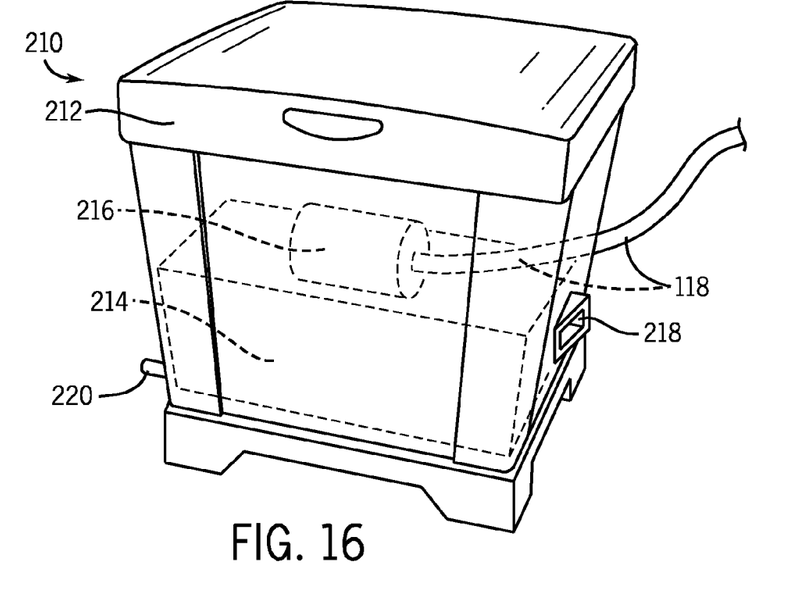
FIGS. 16-17 are perspective views of garden hose booster systems according to other exemplary embodiments of the invention.
Figure 17:
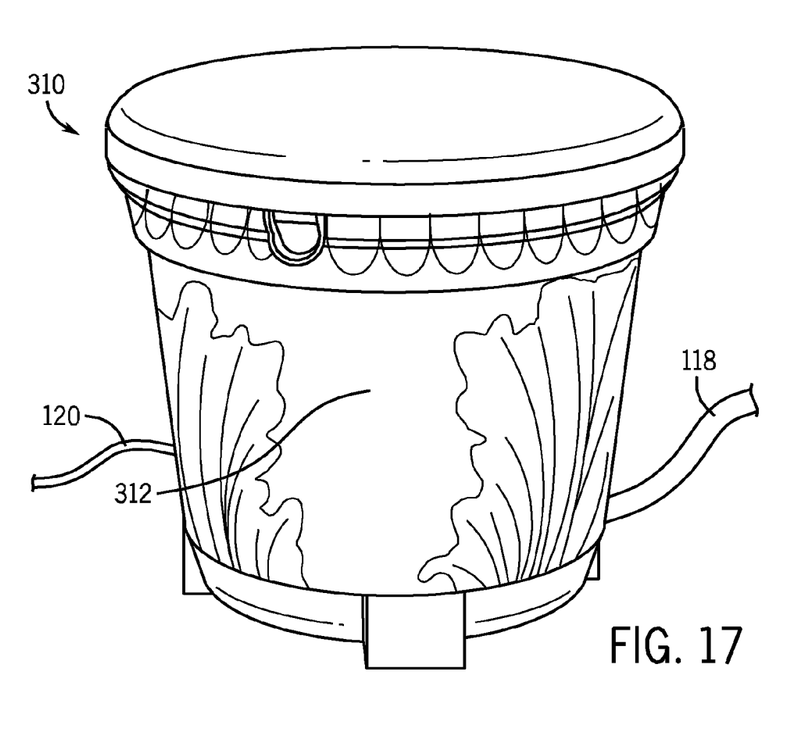

Referring now to FIGS. 16-17, a garden hose booster system 210 (FIG. 16) includes a box-shaped housing 212 supporting an open volume formed therein for storage of a garden hose. The garden hose booster system 210 further includes a motor in the form of a combustion engine 214 stored therein, which is coupled to a water pump 216. An air intake 218 and an exhaust conduit 220 of the combustion engine 214 extend to the outside of the housing 212. In FIG. 17, a garden hose booster system 310 includes an artistic storage vessel 312 having a motorized pump (see, e.g., pump 134 and motor 144 as shown in FIG. 4) stored therein. In still other embodiments, other shapes and forms of garden hose booster systems include a hose storage volume and a motorized pump used to boost the capabilities of a garden hose.

The construction and arrangements of the garden hose booster system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A garden hose booster system, comprising:
    a pump for pressurizing water;
    a motor coupled to and configured to drive the pump;
    a housing supporting the pump and the motor;
    an inlet conduit having a first garden hose coupling on an end thereof, the inlet conduit extending into the housing to direct the water to the pump;
    an outlet conduit having a second garden hose coupling on an end thereof, the outlet conduit extending out of the housing to direct the water from the pump, and
    a storage container comprising:
        a bottom configured to be mounted to a top of the housing, and
        a side wall extending upward from the bottom,
        the side wall and bottom forming an open volume within which a garden hose may be piled or coiled for storage thereof and wherein the bottom includes an open area to allow water to drain from the open volume;
    wherein the outlet conduit extends into the open volume of the storage container such that the garden hose stored in the storage container may be coupled to the second garden hose coupling and may receive a boosted water flow during operation of the garden hose booster system; and
    wherein the top of the housing includes a guide structure to receive water from the open area and the guide structure forms a channel for directing water from a center of the top of the housing to a side of the housing to drain water from the housing.

2. The garden hose booster system of claim 1, wherein the top of the housing further includes one or more vent openings allowing air flow to the motor, the guide structure directing the drain water away from the vent openings.

3. The garden hose booster system of claim 2, wherein the motor is an electric motor, and wherein the housing further includes a hole for an electric cord to extend therethrough to supply power to the electric motor.

4. The garden hose booster system of claim 3, further comprising a control switch associated with the electric motor, the switch coupled to the side of the housing.

5. The garden hose booster system of claim 1, further comprising:
    a cover contoured to be received in a top of the side wall of the storage container during coupling of the cover thereto.

6. The garden hose booster system of claim 5, wherein the cover further comprises one or more recesses in an underside thereof, the recesses sized to at least partially surround one or more corresponding attachments configured to be coupled to the garden hose on an end thereof opposite to the end coupled to the second hose coupling.

7. The garden hose booster system of claim 1, further comprising:
    a cover configured to be received on a top of the storage container, wherein the cover may be lifted off and separated from the storage container, or placed on and coupled to the storage container to selectively allow access to the open volume.

8. The garden hose booster system of claim 7, wherein the storage container includes an opening in the bottom thereof, and wherein the housing includes a boss extending from the top thereof, the boss sized to extend through the opening to facilitate coupling and alignment between the housing and the storage container.

9. The garden hose booster system of claim 8, wherein the outlet conduit and the second garden hose coupling are accessible within the open volume of the storage container by way of an aperture formed in the boss.

10. The garden hose booster system of claim 9, wherein when the cover is placed on and coupled to the storage container a hose aperture is formed therebetween through which the garden hose may extend.

11. The garden hose booster system of claim 10, wherein the cover includes one or more recesses on an underside thereof sized and contoured to receive a corresponding one or more attachments for the garden hose.

12. The garden hose booster system of claim 7, wherein the housing, the storage container, and the cover each have round horizontal cross-sections.

13. The garden hose booster system of claim 12, wherein the diameter of the top of the housing is approximately the same as the diameter of the bottom of the storage container.

14. The garden hose booster system of claim 1, wherein the housing further comprises wheels coupled thereto, the wheels configured to allow the garden hose booster system to be rolled to a desired location.

15. The garden hose booster system of claim 14, wherein the housing further comprises a retractable handle on a side thereof opposite to the wheels.

16. The garden hose booster system of claim 15, wherein the storage container includes an opening in a center of the bottom thereof, and wherein the top of the housing includes a boss sized to extend through the opening of the storage container.

* * * * *